(12) United States Patent
Maeda et al.

(10) Patent No.: US 6,733,724 B1
(45) Date of Patent: May 11, 2004

(54) HYDROGEN ABSORBING ALLOY AND NICKEL-METAL HYDRIDE RECHARGEABLE BATTERY

(75) Inventors: Takao Maeda, Fukui-ken (JP); Satoshi Shima, Fukui-ken (JP); Naofumi Shinya, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/631,491

(22) Filed: Aug. 3, 2000

(30) Foreign Application Priority Data

Aug. 5, 1999 (JP) .......................... 11-221990
Jun. 23, 2000 (JP) ........................ 2000-189040

(51) Int. Cl.$^7$ .................. C22C 19/03; C22C 30/00
(52) U.S. Cl. ................ 420/455; 420/900; 148/426
(58) Field of Search .................. 420/455, 900; 148/426

(56) References Cited

U.S. PATENT DOCUMENTS

| | | | |
|---|---|---|---|
| 4,004,943 A | * 1/1977 | Boter | |
| 4,126,242 A | * 11/1978 | Yajima et al. | 220/660 |
| 4,347,082 A | * 8/1982 | Osumi et al. | 420/416 |
| 4,744,946 A | * 5/1988 | Sasai et al. | 420/443 |
| 6,068,713 A | * 5/2000 | Yamaguchi et al. | 148/513 |
| 6,106,768 A | * 8/2000 | Lee et al. | 420/580 |
| 6,248,475 B1 | * 6/2001 | Hayshida et al. | 429/218.2 |

FOREIGN PATENT DOCUMENTS

| | | | |
|---|---|---|---|
| EP | 0 386 305 A | 9/1990 | |
| EP | 0 790 323 A | 8/1997 | |
| FR | 2 753 991 A | 4/1998 | |
| JP | 56-169746 | * 12/1981 | C22C/28/00 |
| JP | 60-250557 | 12/1985 | |
| JP | 07-057769 A | * 3/1995 | H01M/10/24 |
| JP | 7-56803 B2 | 6/1995 | |

OTHER PUBLICATIONS

A. Visintin et al, "Investigation of a New Modified $AB_5$ Type Alloy for Nickel–Metal Hydride Batteries," Proc. 11th World Energy Conf. (1996), pp. 1983–1988, Int. Assoc. Hydrogen Energy, Coral Gables Fla. US XP000964596.

Patent Abstracts of Japan, vol. 010, no 117 (E–400), May 2, 1986 & JP 60 250557 A (Matsushita Denki Sangyo KK), Dec. 11, 1985.

Patent Abstracts of Japan, vol. 018, No. 468 (C–1244), Aug. 31, 1994 & JP 06 145851 A (Agency of Ind Science & Technol; Others: 01), May 27, 1994.

* cited by examiner

*Primary Examiner*—Roy King
*Assistant Examiner*—Harry D. Wilkins, III
(74) *Attorney, Agent, or Firm*—Alston & Bird LLP

(57) ABSTRACT

An object of the present invention is to provide a hydrogen absorbing alloy which can improve a high rate discharge property while suppressing particle size reduction, exhibits cycle life characteristics equal to or higher than those of conventional alloys even when its cobalt content is decreased, and has a high capacity. Specifically, the present invention provides a hydrogen absorbing alloy having a $CaCu_5$ type crystal structure in its principal phase, wherein the La content in the alloy is in the range of 24 to 33% by weight and the Mg or Ca content in the alloy is in the range of 0.1 to 1.0% by weight, as well as the aforesaid alloy wherein the Co content in the alloy is not greater than 9% by weight.

7 Claims, 1 Drawing Sheet

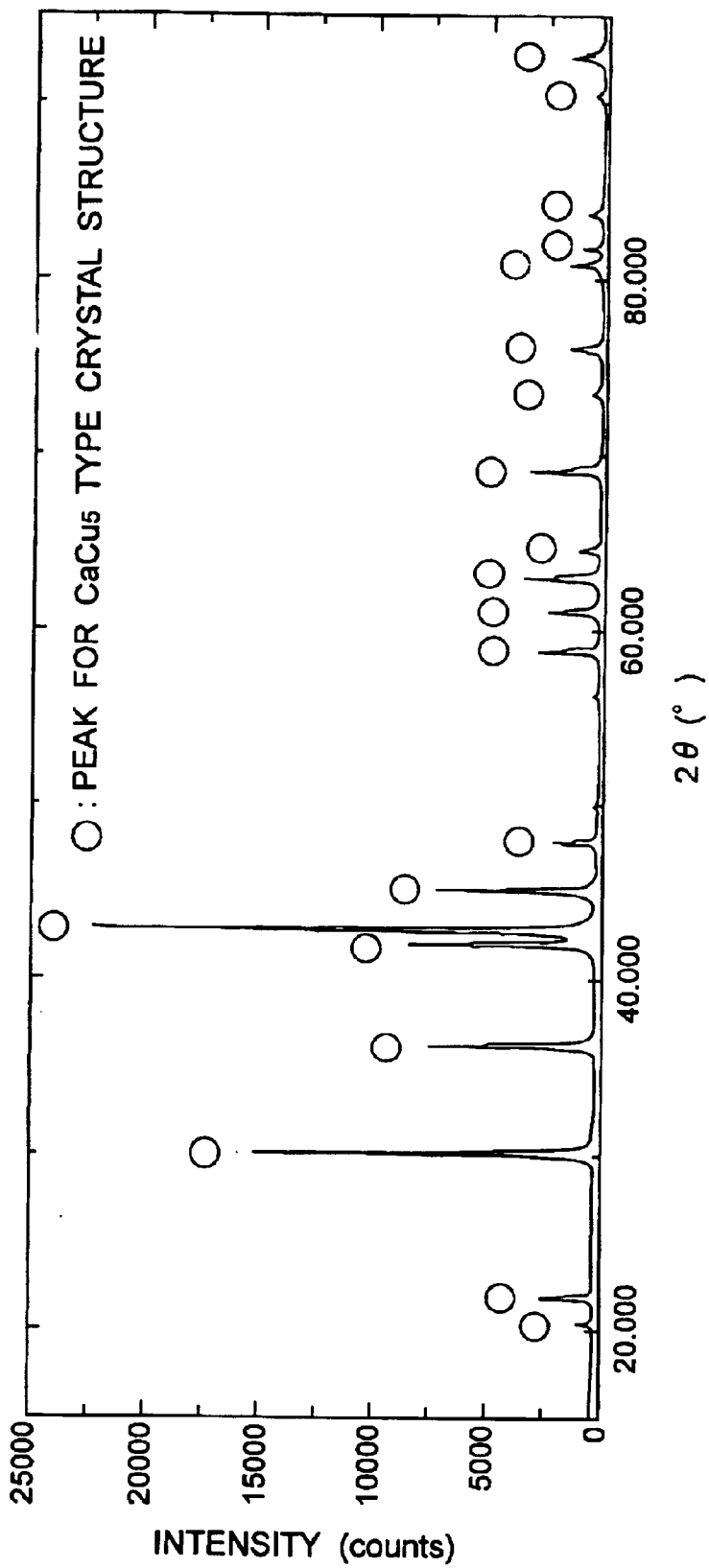

HYDROGEN ABSORBING ALLOY AND NICKEL-METAL HYDRIDE RECHARGEABLE BATTERY

BACKGROUND OF THE INVENTION

1. Field of the Invention

This invention relates to hydrogen absorbing alloys, and more particularly to a hydrogen absorbing alloy which can be used to form negative electrodes for use in nickel-metal hydride rechargeable (secondary) batteries.

2. Description of the Related Art

Conventionally, misch metal (hereinafter referred to as "Mm") comprising a mixture of rare earth elements such as La, Ce, Pr, Nd and Sm, and nickel-base alloys formed by replacing a part of Ni with various elements are widely used as hydrogen absorbing alloys for forming negative electrodes for use in nickel-metal hydride rechargeable batteries.

It is known that, among others, cobalt-containing alloys are capable of absorbing a relatively large amount of hydrogen, are less liable to particle size reduction in their hydrogen-loaded state, have excellent corrosion resistance in alkalis, and are effective in prolonging the lives of nickel-metal hydride rechargeable batteries when they are used for the negative electrodes thereof.

On the other hand, it is also known that lower cobalt contents are more desirable for an improvement of a high rate discharge property. The reason for this is believed to be that a decrease in cobalt content promotes particle size reduction and hence causes an increase in surface area per unit weight.

SUMMARY OF THE INVENTION

In order to solve these problems of the prior art, the present invention provides a hydrogen absorbing alloy which can improve a high rate discharge property while suppressing particle size reduction, exhibits cycle life characteristics equal to or higher than those of conventional alloys even when its cobalt content is decreased, and has a high capacity.

The present invention is based on the discovery that, when a hydrogen absorbing alloy has a relatively high La content and contains an alkaline earth metal (i.e., Mg or Ca) in a relatively small amount above impurity levels, the alloy can improve a high rate discharge property in spite of suppressed particle size reduction while maintaining its high capacity, and can suppress particle size reduction even when its cobalt content is decreased to less than the conventionally known level.

Specifically, the present invention relates to a hydrogen absorbing alloy having a $CaCu_5$ type crystal structure in its principal phase, wherein the La content in the alloy is in the range of 24 to 33% by weight and the Mg or Ca content in the alloy is in the range of 0.1 to 1.0% by weight.

In a preferred embodiment, the present invention also relates to the aforesaid alloy wherein the cobalt content in the alloy is not greater than 9% by weight.

When the hydrogen absorbing alloy of the present invention is used for the negative electrode of an alkaline rechargeable battery, it can increase the capacity of the battery, can improve the high rate discharge property thereof, and can suppress particle size reduction even at low cobalt contents to cause a reduction in battery cost.

BRIEF DESCRIPTION OF THE DRAWING

FIG.1 is a x-ray diffraction pattern for the hydrogen absorbing alloy of Example 1.

DETAILED DESCRIPTION OF THE PREFERRED EMBODIMENTS

In the $AB_5$ type hydrogen absorbing alloy of the present invention, 0.1 to 1.0% by weight of Mg or Ca is contained in order to improve the high rate discharge property while suppressing particle size reduction. Moreover, the La content in the alloy is set at 24 to 33% by weight in order to increase the amount of hydrogen absorbed and control the equilibrium pressure of hydrogen. Thus, as contrasted with conventional alloys, the hydrogen absorbing alloy of the present invention has a high capacity, can improve the high rate discharge property while suppressing particle size reduction, and can enhance resistance to particle size reduction even at low cobalt contents.

Such hydrogen absorbing alloys may, for example, be expressed in terms of the following chemical formulas:

$La_u R_v Mg_w Ni_x Co_y M_z$, and

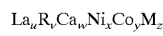

$La_u R_v Ca_w Ni_x Co_y M_z$ wherein R is a rare earth element other than La, M is at least one element chosen from the group consisting of Mn, Al, Si, Sn, Fe, Cu, Ti, Zr, and V or the like, the content of La is preferably 24 to 33% by weight, R 15% by weight, Mg or Ca 0.1 to 1.0% by weight, Ni 50 to 60% by weight, Co 9% by weight or less, and M3 to 10% by weight. Here, the compositional ratios of elements are expressed in terms of atomic ratios (u, v, w, x, y and z). These atomic ratios can be obtained by dividing the percentage-by-weight for each element by the respective atomic weight and then by normalizing the resulting figures using the sum of constitutional ratios of La and R, which are classified as "A" elements. Thus, u plus v equals 1 by definition. Because R is a rare earth element which is other than La, and M is at least one element chosen from the group of Mn, Al, Si, Sn, Fe, Cu, Ti, Zr, V or the like, the weighted averages of atomic weights are used for R and M. Excluding Mg and Ca, which are added in minor amounts, as well as unavoidable impurities, the ratio of elements belonging to "B" to those belonging to "A" is calculated as a B/A ratio according to the following equation: B/A ratio=(x+y+z)/(u+v).

Furthermore, in the $AB_5$ type hydrogen absorbing alloy of the present invention, the remainder of the moiety A comprises one or more rare earth elements other than La, and the remainder of the moiety B comprises one or more transition metals such as Ni, Co and Mn and/or Al or the like. The atomic ratio of B to A, B/A, is preferably 4 to 7, more preferably 5 to 7, further more preferably 5 to 6.

The $AB_5$ type hydrogen absorbing alloy used in the present invention is preferably a hydrogen absorbing alloy having a $CaCu_5$ type crystal structure in its principal phase. As used herein, the expression "hydrogen absorbing alloy having a $CaCu_5$ type crystal structure in its principal phase" refers to a hydrogen absorbing alloy in which, although segregation phases are partly recognized by metallographic observation of a section, the diffraction pattern recorded by XRD exhibits a $CaCu_5$ type alloy phase.

The hydrogen absorbing alloy of the present invention is characterized in that its Mg or Ca content is in the range of 0.1 to 1.0% by weight. If its Mg or Ca content is less than 0.1% by weight, the effect of suppressing particle size reduction will be insufficient. If its Mg or Ca content is greater than 1.0% by weight, the amount of hydrogen absorbed will be decreased to an undue extent.

When the Co content is lowered, the equilibrium pressure of hydrogen at the time of absorption or desorption of hydrogen is elevated. Accordingly, the La content is set at 24 to 33% by weight in order to maintain the equilibrium pressure of hydrogen at the same level as those of conventional alloys and to maintain or improve the high capacity. In the present invention, it is especially preferable to add Mg.

Moreover, the present invention involving the addition of a relatively small amount of Mg or Ca as described above makes it possible to achieve a long life at cobalt contents of not greater than 9% by weight, preferably 7% by weight or less, and more preferably 6% by weight or less, as contrasted with the prior art in which it has been unachievable.

The addition of a small amount of one or more selected from the group consisting of Ti, Zr and V to the Mg- or Ca-containing hydrogen absorption alloy can enhance the initial characteristics or cycle life characteristics. The amount of the addition is as small as 0.5% by weight or less based the Mg- or Ca-containing hydrogen absorbing alloy.

Moreover, the Mg-containing hydrogen absorbing alloy has a $CaCu_5$ type crystal structure in its principal phase, wherein the length for a-axis (a-axis=b-axis) is in the range of 4.990 to 5.050 Å, the length for c-axis is in the range of 4.030 to 4.070, regarding the lattice constants thereof. Comparing the lattice constants in these range between Mg-free and Mg-containing hydrogen absorbing alloys, the addition of Mg tends to increase the lattice constants. It has been particularly found that increase for c-axis is larger than that for a-axis so that the ratio of length of c-axis to length of a-axis, c/a, becomes larger.

It has been found that increase in the ratio c/a results in less liability to particle size reduction so as to produce a battery with longer cycle life. The reason for this is believed to be that the larger face distance between the face perpendicular to c-axis, which are the faces for closest packing of crystal, suppress the extension of the lattice. Consequently, the stress is restrained and the developing distances for cracks become smaller. Thus, the less liability to the particle size reduction for the hydrogen absorbing alloy comprising 0.1 to 1.0% by weight of Mg is thought to be derived from c-axis having longer extension than a-axis.

Further, it has been fount that, the hydrogen absorbing alloy, having 24 to 33% by weight of La, 6 to 9% by weight of Co and the atomic ratio B/A of 5.0 to 5.25, and which Mg is added to in an amount of 0.1 to 1.0% by weight, can result in a battery with higher capacity such as 340 mAh/g or more, keeping cycle life unchanged. In this case, the ratio B/A means the sum of atomic ratios of, for example, Ni, Co, Mn and Al, excluding the elements in very small amounts such as Mg and Ca, by designating the sum of atomic ratios of rare-earth metals such as La, Ce, Pr and Nd for one.

The hydrogen absorbing alloy of the present invention can be manufactured by a dissolution method such as arc dissolution and high frequency dissolution, casting in a mold, table-casting, a rapid roll quenching method, gas atomization, disk-atomization or a spin-cup method, or a combination thereof.

The hydrogen absorbing alloy of the present invention may be prepared in the following manner.

Predetermined amounts of various elements may be weighed out and melted in a high-frequency furnace having an atmosphere of an inert gas (at 200 to 1,500 Torr) such as Ar gas. In the case of an element (e.g., Mg or Ca) having a high vapor pressure, it may be added directly by itself, or in the form of an alloy formed of such an element and one or more other elements constituting the alloy. In the melting method, it may be preferable that Mg or Ca is not added until metals with high melting point such as Ni or Co are melted in order to prevent added components from evaporating or assure the safe operation. The resulting melt may be cast in a mold made of iron at a temperature of 1,300 to 1,600° C. to form an ingot. Or the other methods mentioned above may be also used. In case of special need, the ingot may be heat-treated at a temperature of 800 to 1,200° C. for 5 to 20 hours in an inert atmosphere (at 600 to 1,500 Torr), for example, of Ar gas.

Using a jaw crusher, a roll mill, a hummer mill, a pin mill, a ball mill, a jet mill, a roller mill and the like, the hydrogen absorbing alloy prepared in the above-described manner may be ground to an average particle diameter of 4 to 70 $\mu$m in an inert atmosphere, for example, of Ar. Moreover, reduction in particle size by hydrogen absorption and desorption, so-called hydrogenation method, may be used. Thus, there can be obtained a hydrogen absorbing alloy in accordance with the present invention.

The hydrogen absorbing alloy powder thus obtained may be formed into electrodes according to any well-known method. This can be accomplished, for example, by mixing the alloy powder with a binder selected from polyvinyl alcohol, cellulose derivatives (e.g., methylcellulose), PTFE, polyethylene oxide, high polymer latices and the like, kneading this mixture into a paste, and applying this paste to an electrically conducting three-dimensional support (e.g., foamed nickel or fibrous nickel) or an electrically conducting two-dimensional support (e.g., punching metal). The amount of binder used may be in the range of 0.1 to 20% by weight per 100% by weight of the alloy.

Moreover, if necessary, an electrically conducting filler such as carbon-graphite powder, Ni powder or Cu powder may be added in an amount of 0.1 to 10% by weight based on the alloy.

Alkaline batteries using the hydrogen absorbing alloy of the present invention for the negative electrodes thereof have a long cycle life and exhibit an excellent high rate discharge property and low-temperature discharge characteristics, even when the alloy has a low cobalt content.

The present invention is further illustrated by the following examples. However, these examples are not to be construed to limit the scope of the invention.

EXAMPLE 1 and COMPARATIVE EXAMPLE 1

Mm or rare earth elements such as La, Ce, Pr and Nd, metallic elements such as Ni, Co, Mn and Al, and Mg were weighed out so as to give each of the compositions shown in Table 1. Mg was used in the form of a $MgNi_2$ (m.p. 1100° C.) alloy. These materials were melted in a high-frequency melting furnace, and the resulting melt was cast in a mold made of iron to form an ingot. As for the Mg-free alloy, the ingot is formed without using the Mg—Ni alloy.

This ingot was heat-treated at 1,050° C. for 6 hours in an atmosphere of Ar. Thereafter, using a grinder, this ingot was ground to an average particle diameter of 33 $\mu$m so as to obtain a hydrogen absorbing alloy powder. Analysis of this allow powder by XRD revealed that it had a $CaCu_5$ type crystal structure (FIG.1).

10 g of this powder was mixed with 2.5 g of a 3 wt % aqueous solution of polyvinyl alcohol (with an average degree of polymerization of 2,000 and a degree of saponification of 98 mole %) to prepare a paste. This paste was filled into a porous metallic body of foamed nickel in an amount of 30% by volume, dried, and then pressed into a plate having a thickness of 0.5–1.0 mm. Finally, a negative electrode was made by attaching a lead wire thereto.

A positive electrode, which comprised a sintered electrode, was bonded to the aforesaid negative electrode with a polypropylene separator interposed therebetween. This assembly was immersed in a 6N KOH electrolyte to construct a battery.

Each of the batteries so constructed was tested in the following manner. First of all, at a temperature of 20° C., the battery was charged to 120% at 0.3C (90 mA/g) based on the capacity of the negative electrode, rested for 30 minutes, and then discharged at 0.2C (60 mA/g) until the battery voltage reached 0.6 V. When this cycle was repeated twenty times, the greatest discharge capacity was regarded as the "capacity" of the alloy. Subsequently, this battery was charged to 120% at 0.3C, and discharged at 2.0C (600 mA/g). The capacity measured in this manner was regarded as the "high rate discharge capacity". Thereafter, in order to observe the degree of particle size reduction, the negative electrode was disassembled, placed in water, and exposed to ultrasonic waves from an ultrasonic horn so as to separate the alloy powder from the current collector. The particle size distribution after repeated charging and discharging was measured by means of a Microtrack analyzer to determine the average particle diameter $D_{50}$ ($\mu$m). The results thus obtained are shown in Table 1. It is to be understood that, when the frequency of occurrence of each particle diameter in the measured particle size distribution is cumulatively added from the smaller to the larger side, the particle diameter corresponding to 50% of the entire distribution is defined as $D_{50}$.

TABLE 1

| | Alloy composition (wt %) | | | | | | | | | Capacity | High rate discharge capacity | Average particle diameter after size reduction |
|---|---|---|---|---|---|---|---|---|---|---|---|---|
| | La | Ce | Pr | Nd | Mg | Ni | Co | Mn | Al | (mAh/g) | (mAh/g) | ($\mu$m) |
| Example 1 | 25.04 | 3.16 | 1.90 | 1.30 | 0.27 | 56.61 | 5.31 | 4.58 | 1.82 | 305 | 220 | 25.31 |
| Comparative Example 1 | 25.45 | 3.21 | 1.94 | 1.32 | 0.00 | 53.76 | 8.64 | 3.77 | 1.92 | 302 | 162 | 23.14 |

As shown in Table 1, Mg-containing alloy has a better high rate discharge property and less liability to particle size reduction.

EXAMPLES 2–5 AND COMPARATIVE EXAMPLE 2

The compositions shown in Table 2 were employed for the formation of alloys in the same manner as Example 1 and capacities were measured in the same matter as Example 1 to examine the relationship between the La content and the capacity when magnesium is contained in the alloys. The results thus obtained are shown in Table 2. It can be seen from Table 2 that, in order to obtain an alloy having a high capacity, the La content in the alloy must be not less than 24% by weight.

TABLE 2

| | Alloy composition (wt %) | | | | | | | | | Capacity |
|---|---|---|---|---|---|---|---|---|---|---|
| | La | Ce | Pr | Nd | Mg | Ni | Co | Mn | Al | (mAh/g) |
| Example 2 | 25.56 | 3.87 | 1.30 | 1.33 | 0.17 | 58.86 | 2.71 | 3.79 | 2.42 | 306 |
| Example 3 | 25.06 | 3.79 | 1.27 | 1.30 | 0.16 | 58.92 | 2.66 | 4.46 | 2.37 | 297 |
| Example 4 | 24.86 | 3.76 | 1.26 | 1.29 | 0.27 | 59.22 | 2.64 | 3.69 | 3.02 | 293 |
| Example 5 | 24.69 | 3.74 | 1.25 | 1.28 | 0.27 | 58.81 | 2.62 | 5.00 | 2.34 | 289 |
| Comparative Example 2 | 23.80 | 6.25 | 1.32 | 1.35 | 0.29 | 57.44 | 2.77 | 4.38 | 2.41 | 275 |

EXAMPLES 6–8 AND COMPARATIVE EXAMPLE 3

Employing the compositions shown in Table 3, alloy powders were prepared in the same manner as in Example 1. Then, electrode tests were carried out in the same manner as in Example 1 to determine the respective capacities. The results thus obtained are shown in Table 3. It can be seen from Table 3 that Mg contents of greater than 1.0% by weight cause an undue reduction in capacity.

TABLE 3

| | Alloy composition (wt %) | | | | | | | | Capacity |
|---|---|---|---|---|---|---|---|---|---|
| | La | Ce | Pr | Nd | Mg | Ni | Co | Mn | Al | (mAh/g) |
| Example 6 | 26.59 | 3.87 | 1.30 | 1.33 | 0.17 | 58.94 | 2.71 | 3.80 | 2.30 | 306 |
| Example 7 | 25.53 | 3.86 | 1.29 | 1.33 | 0.28 | 58.80 | 2.71 | 3.79 | 2.42 | 301 |
| Example 8 | 24.97 | 3.78 | 1.27 | 1.30 | 0.55 | 58.69 | 2.65 | 4.44 | 2.36 | 286 |
| Comparative Example 3 | 24.99 | 3.15 | 1.27 | 1.30 | 1.09 | 58.74 | 2.65 | 4.45 | 2.37 | 270 |

EXAMPLES 9–12 AND COMPARATIVE EXAMPLES 4–7

Employing the alloy compositions shown in Table 4, electrode tests were carried out in the same manner as in Example 1. Thereafter, each negative electrode was disassembled, placed in water, and exposed to ultrasonic waves from an ultrasonic horn so as to separate the alloy powder from the current collector. The particle size distribution after repeated charging and discharging was measured by means of a Microtrack analyzer to determine the average particle diameter $D_{50}$ ($\mu$m). On the basis of the average particle diameter of an alloy containing no Mg, the effect of Mg addition, i.e. the improvement of particle size reduction, was calculated as R1 (%) according to the following equation.

$R1(\%) = \{(D_{50}(\mu m) \text{ of Mg-containing alloy})/(D_{50}(\mu m) \text{ of Mg-free alloy})\} \times 100(\%)$ Since the degree of particle size reduction varies greatly with the Co content, the improvement of particle size reduction is independently shown with respect to each Co content. The $D_{50}$ is defined in such a way that, when the particle size distribution of the hydrogen absorbing alloy is measured and the frequencies of detection of various particle diameters are cumulatively added from smaller-diameter to larger-diameter particles, the particle diameter corresponding 50% of all particles is represented by $D_{50}$.

for example, of less than 0.1% by weight, the improvement of particle size reduction is as low as 5% or less. Moreover, it can also be seen that, at a high Co content, for example, of greater than 9% by weight, the effect of Mg addition is lessened. In commercially available nickel-metal hydride rechargeable batteries having a high capacity, the Co content is usually not less than 9%. However, it can be seen that the present invention exhibits a significant effect at Co contents of not greater than 7%.

EXAMPLES 14–17 AND COMPARATIVE EXAMPLES 8–11

Employing the alloy compositions shown in Table 5, the alloy powders were prepared in the same manner as in Example 1 except the following: metallic Mg (m.p. 650° C.) was used instead of the Mg—Ni alloy, and the mixture of Ni, Co, Mn, Al and some of rare-earth elements were melted in advance, and then after confirming the melting, the other of rare-earth elements and metallic Mg were added. As for the Mg-free alloys, the melting was carried out without addition of the metallic Mg.

The capacity in Table 5 was measured as follows. After dry-mixing hydrogen absorbing alloy 0.5 and Ni powder 1.5 in the weight ratio, the mixture was molded in a mold with a diameter of 20 mm to produce an electrode. The battery was charged to 125% at 0.5C (150 mA/g), rested for 10 minutes, and then discharged at 0.5C (150 mA/g) until the voltage difference based on mercury reference electrode

TABLE 4

| | Alloy composition (wt %) | | | | | | | | | Improvement of particle size reduction R1 |
|---|---|---|---|---|---|---|---|---|---|---|
| | La | Ce | Pr | Nd | Mg | Ni | Co | Mn | Al | (%) |
| Example 9 | 25.53 | 3.86 | 1.29 | 1.33 | 0.28 | 58.80 | 2.71 | 3.79 | 2.42 | 129.2 |
| Example 10 | 24.97 | 3.78 | 1.27 | 1.30 | 0.55 | 58.69 | 2.65 | 4.44 | 2.36 | 134.7 |
| Comparative Example 4 | 25.60 | 3.87 | 1.30 | 1.33 | 0.00 | 58.96 | 2.72 | 3.80 | 2.42 | 100.0 |
| Comparative Example 5 | 25.56 | 3.87 | 1.30 | 1.33 | 0.08 | 58.86 | 2.71 | 3.79 | 2.42 | 104.0 |
| Example 11 | 25.51 | 3.86 | 1.29 | 1.32 | 0.28 | 56.19 | 5.41 | 3.78 | 2.35 | 121.7 |
| Comparative Example 6 | 25.58 | 3.87 | 1.30 | 1.33 | 0.00 | 56.34 | 5.43 | 3.79 | 2.36 | 100.0 |
| Example 12 | 25.38 | 3.84 | 1.29 | 1.32 | 0.28 | 53.62 | 8.61 | 3.76 | 1.91 | 110.5 |
| Comparative Example 7 | 25.45 | 3.85 | 1.29 | 1.32 | 0.00 | 53.77 | 8.64 | 3.77 | 1.92 | 100.0 |
| Example 12 | 25.37 | 3.84 | 1.29 | 1.32 | 0.28 | 53.20 | 9.42 | 3.39 | 1.91 | 103.0 |
| Comparative Example 8 | 25.44 | 3.85 | 1.29 | 1.32 | 0.00 | 53.09 | 9.45 | 3.65 | 1.92 | 100.0 |

It can be seen from Table 4 that the addition of Mg suppresses particle size reduction at the same Co content, and this effect becomes more pronounced as the Co content is decreased. It can also be seen that, at a low Mg content, (Hg/HgO) reached 0.6V. After this cycle was repeated ten times, the capacity was measured (as pellet capacity).

Moreover, Cycle life was measured as follows. Using the above-mentioned sample battery having the paste electrode, at a temperature of 20° C., the battery was charged to 120% at 0.3C (90 mA/g) based on the capacity of the negative electrode, rested for 30 minutes, and then discharged at 0.2C (60 mg/g) until the battery voltage based on the positive electrode reached 0.8 V. This cycle for charge and discharge was repeated two hundred times, and the maintenance of discharge capacity (cycle life) was calculated using the next equation.

Maintenance(%)={(discharge capacity after 200 cycles)/(discharge capacity after 20 cycles)}×100

Further, using the above-mentioned sample battery having the paste electrode, at a temperature of 20° C., the battery was charged at 0.3C (90 mA/g) based on the capacity of the negative electrode, rested for 30 minutes, and then discharged at 0.2C (60 mA/g) until the battery voltage reached 0.8 V. After this cycle was repeated twenty times, in order to observe the degree of particle size reduction, the battery was disassembled and the alloy powder for the negative electrode was exposed to ultrasonic waves from an ultrasonic horn so as to separate the alloy powder from the current collector. The particle size distribution after repeated charging and discharging was measured by means of a Microtrack analyzer to determine the average particle diameter $D_{50}$ ($\mu$m). The improvement of particle size reduction R1 was calculated.

The diffraction patterns for the alloys shown in Table 5 were measured using a X-ray diffraction method for powder. The lattice constants were calculated based on the measurement data using a method of least squares.

As shown in Table 5, focusing on the effects of the addition of Mg, the addition of Mg increases capacity, cycle life, and improvement of particle size reduction. Comparison of the lattice constants shows that the addition of Mg tends to increase the c-axis more remarkably than a-axis. This is thought to be one of the reasons why the higher capacity and increased cycle life are attained. The results for Examples 16 and 17 show the specific increase of discharge capacity, although increase of cycle life therefor is fair.

EXAMPLES 18 TO 32, COMPARATIVE EXAMPLES 12 TO 19

Employing the alloy compositions shown in Table 6, the alloy powders were prepared using $MgNi_2$ (m.p. 1100° C.) in the same manner as in Example 1 except the following: the mixture of Ni, Co, Mn, Al and some of rare-earth elements were melted at first. Then, after the confirmation of the melting, the other of rare-earth elements and the Mg—Ni alloy were added for melting. As for the Mg-free alloys, the melting was carried out without addition of the metallic Mg.

Pellet capacity and maintenance of discharge capacity (cycle life) were obtained as the same manner as described above. After the average particle diameter $D_{50}$ was obtained as the same manner as described above, the improvement of particle size reduction was calculated as R2 (%) according the following equation. The R2 shows the inhibition effect against particle size reduction for the alloys other than the alloy for Example 16 on the basis of the average particle diameter of the alloy of Comparative Example 16.

R2(%)={($D_{50}$($\mu$m) of Mg-containing alloy)/($D_{50}$($\mu$m) of the alloy for Example 16 alloy)}×100(%)

TABLE 5

| | Alloy composition (wt %) | | | | | | | | Capacity | Cycle life | Improvement of particle size reduction R1 | Length of a-axis | Length of c-axis | Elongation of a-axis | Elongation of c-axis |
|---|---|---|---|---|---|---|---|---|---|---|---|---|---|---|---|
| | La | Ce | Pr | Nd | Mg | Ni | Co | Mn | Al | (mAh/g) | (%) | (%) | (Å) | (Å) | (Å) | (Å) |
| Example 14 | 25.07 | 3.79 | 1.27 | 1.30 | 0.27 | 57.88 | 3.99 | 4.46 | 1.95 | 330 | 90 | 117 | 5.020 | 4.063 | 0.002 | 0.007 |
| Comparative Example 8 | 25.14 | 3.80 | 1.28 | 1.31 | 0.00 | 58.04 | 4.00 | 4.48 | 1.95 | 320 | 82 | 100 | 5.018 | 4.056 | Reference | Reference |
| Example 15 | 25.04 | 3.79 | 1.27 | 1.30 | 0.27 | 56.36 | 5.31 | 4.83 | 1.82 | 335 | 93 | 114 | 5.024 | 4.061 | 0.001 | 0.006 |
| Comparative Example 9 | 25.11 | 3.80 | 1.27 | 1.30 | 0.00 | 56.51 | 5.33 | 4.84 | 1.83 | 330 | 85 | 100 | 5.023 | 4.055 | Reference | Reference |
| Example 16 | 28.07 | 3.86 | 0.00 | 0.00 | 0.28 | 55.81 | 6.77 | 3.66 | 1.55 | 350 | 83 | 115 | 5.033 | 4.048 | 0.000 | 0.008 |
| Comparative Example 10 | 28.15 | 3.87 | 0.00 | 0.00 | 0.00 | 55.97 | 6.79 | 3.67 | 1.55 | 330 | 70 | 100 | 5.033 | 4.040 | Reference | Reference |
| Example 17 | 28.07 | 3.86 | 0.00 | 0.00 | 0.28 | 54.59 | 8.12 | 3.53 | 1.55 | 348 | 90 | 107 | 5.034 | 4.046 | 0.001 | 0.006 |
| Comparative Example 11 | 28.15 | 3.87 | 0.00 | 0.00 | 0.00 | 54.74 | 8.14 | 3.54 | 1.55 | 325 | 80 | 100 | 5.033 | 4.040 | Reference | Reference |

TABLE 6

| | Alloy composition (wt %) | | | | | | | | | Ratio | Capacity | Cycle life | Improvement of particle size reduction R2 |
|---|---|---|---|---|---|---|---|---|---|---|---|---|---|
| | La | Ce | Pr | Nd | Mg | Ni | Co | Mn | Al | B/A | (mAh/g) | (%) | (%) |
| Example 18 | 28.74 | 3.22 | 0.00 | 0.00 | 0.28 | 53.30 | 8.81 | 3.79 | 1.86 | 5.20 | 340 | 93 | 137 |
| Example 19 | 28.74 | 3.22 | 0.00 | 0.00 | 0.28 | 53.98 | 8.13 | 3.79 | 1.86 | 5.20 | 350 | 90 | 130 |
| Example 20 | 28.74 | 3.22 | 0.00 | 0.00 | 0.28 | 54.66 | 7.45 | 3.79 | 1.86 | 5.20 | 350 | 88 | 130 |
| Comparative Example 12 | 28.82 | 3.23 | 0.00 | 0.00 | 0.00 | 52.77 | 9.51 | 3.80 | 1.87 | 5.20 | 315 | 90 | 130 |

TABLE 6-continued

|  | Alloy composition (wt %) | | | | | | | | Ratio | Capacity | Cycle life | Improvement of particle size reduction R2 |
|---|---|---|---|---|---|---|---|---|---|---|---|---|
|  | La | Ce | Pr | Nd | Mg | Ni | Co | Mn | Al | B/A | (mAh/g) | (%) | (%) |
| Comparative Example 13 | 28.82 | 3.23 | 0.00 | 0.00 | 0.00 | 53.45 | 8.83 | 3.80 | 1.87 | 5.20 | 320 | 83 | 130 |
| Comparative Example 14 | 28.82 | 3.23 | 0.00 | 0.00 | 0.00 | 54.13 | 8.15 | 3.80 | 1.87 | 5.20 | 323 | 77 | 125 |
| Comparative Example 15 | 28.82 | 3.23 | 0.00 | 0.00 | 0.00 | 54.81 | 7.47 | 3.80 | 1.87 | 5.20 | 328 | 73 | 115 |
| Comparative Example 16 | 28.82 | 3.23 | 0.00 | 0.00 | 0.00 | 55.49 | 6.79 | 3.80 | 1.87 | 5.20 | 330 | 89 | 100 |
| Example 21 | 28.74 | 3.22 | 0.00 | 0.00 | 0.28 | 52.63 | 9.48 | 3.79 | 1.86 | 5.20 | 325 | 97 | 140 |
| Example 22 | 28.74 | 3.22 | 0.00 | 0.00 | 0.28 | 55.33 | 6.77 | 3.79 | 1.86 | 5.20 | 350 | 83 | 120 |
| Example 23 | 30.34 | 0.97 | 0.32 | 0.33 | 0.28 | 53.98 | 8.13 | 3.79 | 1.86 | 4.20 | 350 | 88 | 130 |
| Example 24 | 28.74 | 2.58 | 0.32 | 0.33 | 0.28 | 53.97 | 8.13 | 3.79 | 1.86 | 5.20 | 350 | 90 | 130 |
| Example 25 | 27.14 | 3.86 | 0.65 | 0.33 | 0.28 | 53.97 | 8.13 | 3.79 | 1.86 | 5.20 | 345 | 92 | 130 |
| Example 26 | 23.93 | 6.44 | 0.97 | 0.66 | 0.28 | 53.94 | 8.12 | 3.79 | 1.86 | 5.20 | 340 | 92 | 130 |
| Comparative Example 17 | 32.03 | 0.00 | 0.00 | 0.00 | 0.00 | 54.15 | 8.15 | 3.80 | 1.87 | 5.20 | 350 | 75 | 110 |
| Comparative Example 18 | 21.13 | 7.31 | 1.23 | 6.27 | 0.00 | 51.03 | 7.69 | 3.58 | 1.76 | 5.20 | 330 | 92 | 130 |
| Comparative Example 19 | 20.79 | 9.04 | 1.30 | 1.00 | 0.00 | 54.07 | 8.14 | 3.80 | 1.86 | 5.20 | 320 | 93 | 130 |
| Example 27 | 27.89 | 3.84 | 0.00 | 0.00 | 0.28 | 56.15 | 6.70 | 3.62 | 1.53 | 5.25 | 345 | 85 | 121 |
| Example 28 | 28.07 | 3.86 | 0.00 | 0.00 | 0.28 | 55.86 | 6.74 | 3.64 | 1.54 | 5.20 | 350 | 85 | 118 |
| Example 29 | 28.26 | 3.89 | 0.00 | 0.00 | 0.28 | 55.56 | 6.79 | 3.67 | 1.55 | 5.15 | 350 | 83 | 114 |
| Example 30 | 28.46 | 3.91 | 0.00 | 0.00 | 0.28 | 55.26 | 6.83 | 3.69 | 1.56 | 5.10 | 355 | 80 | 110 |
| Example 31 | 28.65 | 3.94 | 0.00 | 0.00 | 0.28 | 54.95 | 6.88 | 3.72 | 1.57 | 5.05 | 355 | 75 | 107 |
| Example 32 | 28.85 | 3.97 | 0.00 | 0.00 | 0.29 | 54.64 | 6.93 | 3.75 | 1.59 | 5.00 | 360 | 70 | 105 |

As shown in Table 6, the alloys keeping La content of 24 to 33% by weight and Co content of 6 to 9% by weight in addition of 0.1 to 1.0% by weight of Mg with the B/A atomic ratio of 5.0 to 5.25, enables the achievement for the higher capacity such as 340 mAh/g or more of capacity, although the cycle life therefor is as usual.

What is claimed is:

1. A hydrogen absorbing alloy having a $CaCu_5$ crystal structure in its principal phase, comprising La in an amount of 24 to 33% by weight in the alloy, Mg in an amount of 0.1 to 1.0% by weight in the alloy, and greater than 0% and less than or equal to 6% by weight of Co in the alloy.

2. A hydrogen absorbing alloy according to claim 1, further comprising one or more elements selected from the group consisting of Ti, Zr and V.

3. A hydrogen absorbing alloy according to claim 1 having a-axis length of 4.990 to 5.050 Å and c-axis length of 4.030 to 4.070 Å for the lattice constants in the $CaCu_5$ type crystal structure.

4. A hydrogen absorbing alloy according to claim 1, wherein said alloy is represented by the formula $La_u R_v Mg_w Ni_x Co_y M_z$, wherein:

R is a rare earth element other than La;

M is at least one element selected from the group consisting of Mn, Al, Si, Sn, Fe, Cu, Ti, Zr, and V; and the ratio of $(x+y+z)/(u+v)$ is 4 to 7.

5. A hydrogen absorbing alloy having a $CaCu_5$ crystal structure in its principal phase, comprising Mg and having a-axis length of 4.990 to 5.050 Å and c-axis length of 4.030 to 4.070 Å for the lattice constants in the $CaCu_5$ crystal structure.

6. A hydrogen absorbing alloy according to claim 5, further comprising greater than 0% and less than or equal to 6% by weight of Co in the alloy.

7. A nickel-metal hydride rechargeable battery comprising an electrode formed of a hydrogen absorbing alloy having a $CaCu_5$ crystal structure in its principal phase, said alloy comprising La in an amount of 24 to 33% by weight in the alloy, Mg in an amount of 0.1 to 1.0% by weight in the alloy, and greater than 0% and less than or equal to 6% by weight of Co in the alloy.

* * * * *